United States Patent
Hofmann

(10) Patent No.: US 9,138,100 B2
(45) Date of Patent: Sep. 22, 2015

(54) IGNITER FOR SOLID COOKING FUELS

(71) Applicant: Scott Hofmann, Mason, MI (US)

(72) Inventor: Scott Hofmann, Mason, MI (US)

(*) Notice: Subject to any disclaimer, the term of this patent is extended or adjusted under 35 U.S.C. 154(b) by 407 days.

(21) Appl. No.: 13/828,968

(22) Filed: Mar. 14, 2013

(65) Prior Publication Data

US 2014/0261376 A1    Sep. 18, 2014

(51) Int. Cl.
| | |
|---|---|
| *A47J 37/07* | (2006.01) |
| *F23Q 13/04* | (2006.01) |
| *F24B 15/00* | (2006.01) |
| *F23Q 7/14* | (2006.01) |
| *F24H 9/06* | (2006.01) |

(52) U.S. Cl.
CPC ............ *A47J 37/079* (2013.01); *F23Q 7/14* (2013.01); *F23Q 13/04* (2013.01); *F24B 15/005* (2013.01); *F24H 9/06* (2013.01)

(58) Field of Classification Search
CPC ....... A47J 37/079; A47J 45/085; F23Q 13/04; F23Q 7/02; F23Q 7/04; F23Q 7/14; F24H 9/06; F24H 9/0057; F24H 3/0423; F24B 15/005
See application file for complete search history.

(56) References Cited

U.S. PATENT DOCUMENTS

| | | | |
|---|---|---|---|
| 4,422,435 A | 12/1983 | Spell | |
| 5,469,835 A | 11/1995 | Stephen et al. | |
| 6,009,867 A | 1/2000 | Walton | |
| 6,053,161 A * | 4/2000 | Klaus | 126/25 B |
| 6,913,013 B1 | 7/2005 | Mize | |
| 7,717,104 B2 | 5/2010 | Looft | |
| 8,316,836 B2 | 11/2012 | Grasso et al. | |

FOREIGN PATENT DOCUMENTS

EP    0934491 A1    8/1997

* cited by examiner

*Primary Examiner* — Alfred Basichas
(74) *Attorney, Agent, or Firm* — Maier & Maier, PLLC

(57) ABSTRACT

An igniter for solid cooking fuels includes a heat chamber and a heat gun manifold. The heat gun manifold includes a manifold flange with a first hole, the manifold flange attached to a bottom of the heat chamber, and a manifold tube received within the first hole. A top of the manifold tube received at least partially within the heat chamber. A heat gun may be removably coupled to a bottom of the manifold tube with the heat gun in fluid communication with the heat chamber. An upper handle may be attached to an outer surface of the heat chamber with a heat shield between the upper handle and the heat chamber.

16 Claims, 2 Drawing Sheets

IGNITER FOR SOLID COOKING FUELS

BACKGROUND

Charcoal is popular cooking fuel used throughout the world. Charcoal is used as a fuel to cook food using fire. Charcoal has an advantage over fire burning wood since it does not generate as much soot and it provides the chef greater heat control. Although charcoal is an archaic cooking fuel, charcoal imparts a pleasant atmosphere for any gathering. The odor reminds people of good food and fellowship with friends and family.

The ease and convenience of grills using propane, natural gas and electricity has caused people to choose alternatives to using charcoal for grilling their food. Having the ability to light charcoal quickly and cleanly will make the use of charcoal more convenient. If charcoal can be ignited quickly, cleanly and safely, more people will enjoy it's pleasing cooking qualities.

People light charcoal on fire using various methods including chemical accelerants such as charcoal lighting fluid; physical heating methods such as hot ceramic heaters; concentrated heat, for example lighting a small fire under a venter tube containing the charcoal (i.e. chimney starter); and a hybrid type, for example, by using a physical heating method along with concentrated heat.

Since smell and taste are closely linked, it is important to prepare charcoal in ways that will not impart offending or poisonous odor into the food that is being cooked. Charcoal lighting fluid is a petroleum based liquid that smells bad and is often not quickly burned up once the charcoal is ready for cooking. The person preparing the grill generally places the charcoal to be lit inside the grill that they will be cooking the food. The lighter fluid is sprayed on the charcoal. When the user sprays the charcoal lighter fluid onto the charcoal however, charcoal lighter fluid also penetrates the charcoal ash that is setting in the bottom of the grilling vessel. The charcoal lighting fluid can also permeate the grill walls if the grill is made of ceramic, file tile or brick.

Some devices have aspects that utilize fuel as an accelerant to ignite the charcoal. As a result of the use of the fuel, there is a strong likelihood that the smell of the fuel may linger after ignition of the charcoal.

In order to combat the deleterious effects of charcoal fluid, charcoal starters that employed the use of electric heating elements have been used to ignite charcoal. However, these lighters have slow ignition speeds since there is no forced air helping to speed ignition. Because the heat from the electric heating element immediately touching a piece of charcoal provides the source of ignition, the remaining charcoal is only later ignited by the charcoal that was ignited by the electric heating element.

Other solutions for igniting charcoal without the use of charcoal lighter fluid use hot air from a small fire lit under the charcoal igniter. These types of solutions are commonly referred to as 'chimney starters'. These solutions require the user to crumple up newspaper or other easily ignitable material and place this material under the unit, light the newspaper on fire with a lighter or match, and wait for the hot air and gases from the fire produced by the burning newspaper to ignite the charcoal. When the charcoal is fully ignited, the charcoal is dumped into the cooking vessel. However, these charcoal starters have numerous disadvantages. For, example, these starters produce a larger mess from the ash resulting from igniting the newspaper or other material that is placed under the unit to start the ignition. These igniters also depend on airflow from the charcoal that is near the bottom of the igniter. In order to provide the airflow, air holes are provided on the bottom and sides of these starters. Charcoal ash or small ignited charcoal can fall out of the starter during the ignition phase. To prevent this problem, the user will use this igniter inside the grilling vessel but if the user wishes to ignite more charcoal to be added later on in the cooking cycle, they will have to use these igniters inside another separate grilling vessel or another heat resistant container.

Furthermore, these charcoal lighters may produce excessive heat. Due to the heat generated from the ignition of the charcoal, these charcoal starters must be placed inside the grilling vessel or on a surface that is not damaged from heat and fire. If the user has a patio or deck made of wood or a plastic material, these charcoal starters can cause significant damage to the patio or deck material. Even if the patio or deck material is made from stone, concrete or tile, fire and heat can still damage the surface by leaving marks or causing cracking from the heat.

In order to improve the speed of ignition, other solutions attempted to combine forced air along with an ignition mechanism. However, these devices often do not allow the user to heat charcoal outside of the cooking vessel or grill so the user would not be able to light new charcoal outside of the cooking session without disturbing the existing cooking session or using a separate grilling vessel.

Other disadvantages of these devices are that the heating mechanism and blower are integrated with the unit. Forced air heating apparatus such as heat guns tend to wear out quickly due to the extreme temperature variances that it undergoes with normal use. If the forced air heating apparatus were to wear out, the entire unit must be discarded.

Another problem that many chimney style heat chamber designs have is that the handles will become too hot to touch as the charcoal catches fire. This problem can only be addressed by making a heat insulated handle that is manufactured from heat resistant material such as wood, spiraled metal or plastic. Regardless of how heat resistant these materials are however, they will still heat up over time while being exposed to heat. The best way to prevent the handle from heating up is to keep it from touching other metal that is hot.

Therefore, a charcoal lighter that is fast, reliable and efficient that overcomes the aforementioned drawbacks of other lighters is desirable.

SUMMARY

According to one exemplary embodiment, an igniter for solid cooking fuels including a heat chamber and a heat gun manifold may be disclosed. The heat gun manifold includes a manifold flange with a first hole, the manifold flange attached to a bottom of the heat chamber, and a manifold tube received within the first hole. A top of the manifold tube may be received at least partially within the heat chamber. A heat gun may be removably coupled to a bottom of the manifold tube with the heat gun in fluid communication with the heat chamber. An upper handle may be attached to an outer surface of the heat chamber near the bottom of the heat chamber with a heat shield between the upper handle and the heat chamber.

According to another exemplary embodiment, a method for igniting solid cooking fuels may be disclosed. Solid cooking fuel may be placed into a heat chamber. A heat gun manifold may be attached to the heat chamber such that a first end of a manifold tube is received at least partially within the heat chamber. A heat gun may be attached to a second end of the manifold tube such that the heat gun is in fluid communication with the heat chamber. The heat gun may be activated to ignite the solid cooking fuels. The solid cooking fuels may then be transferred to a cooking vessel.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Figure 1:
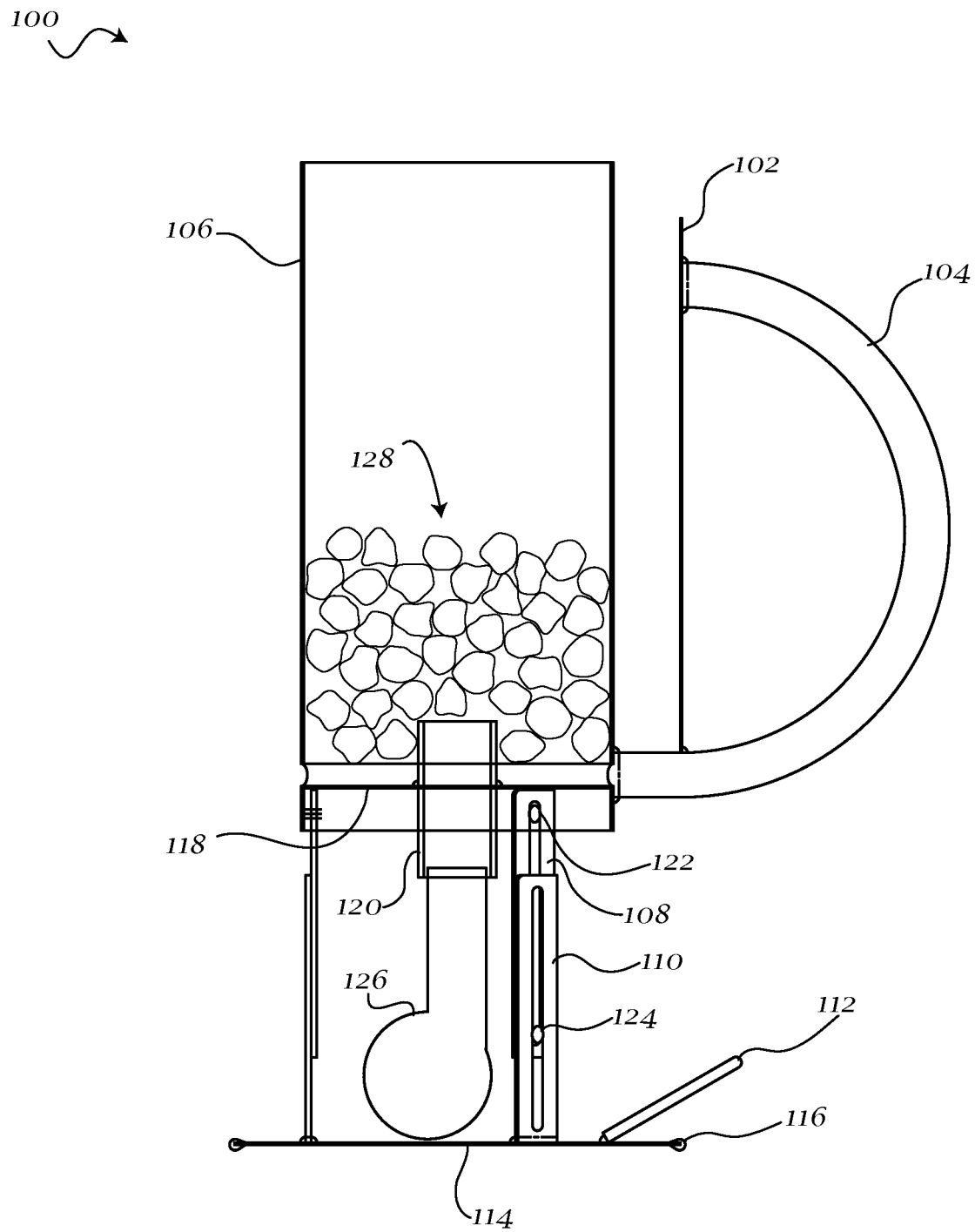
FIG. 1 is an exemplary side view of an embodiment of an igniter apparatus.
Figure 2:
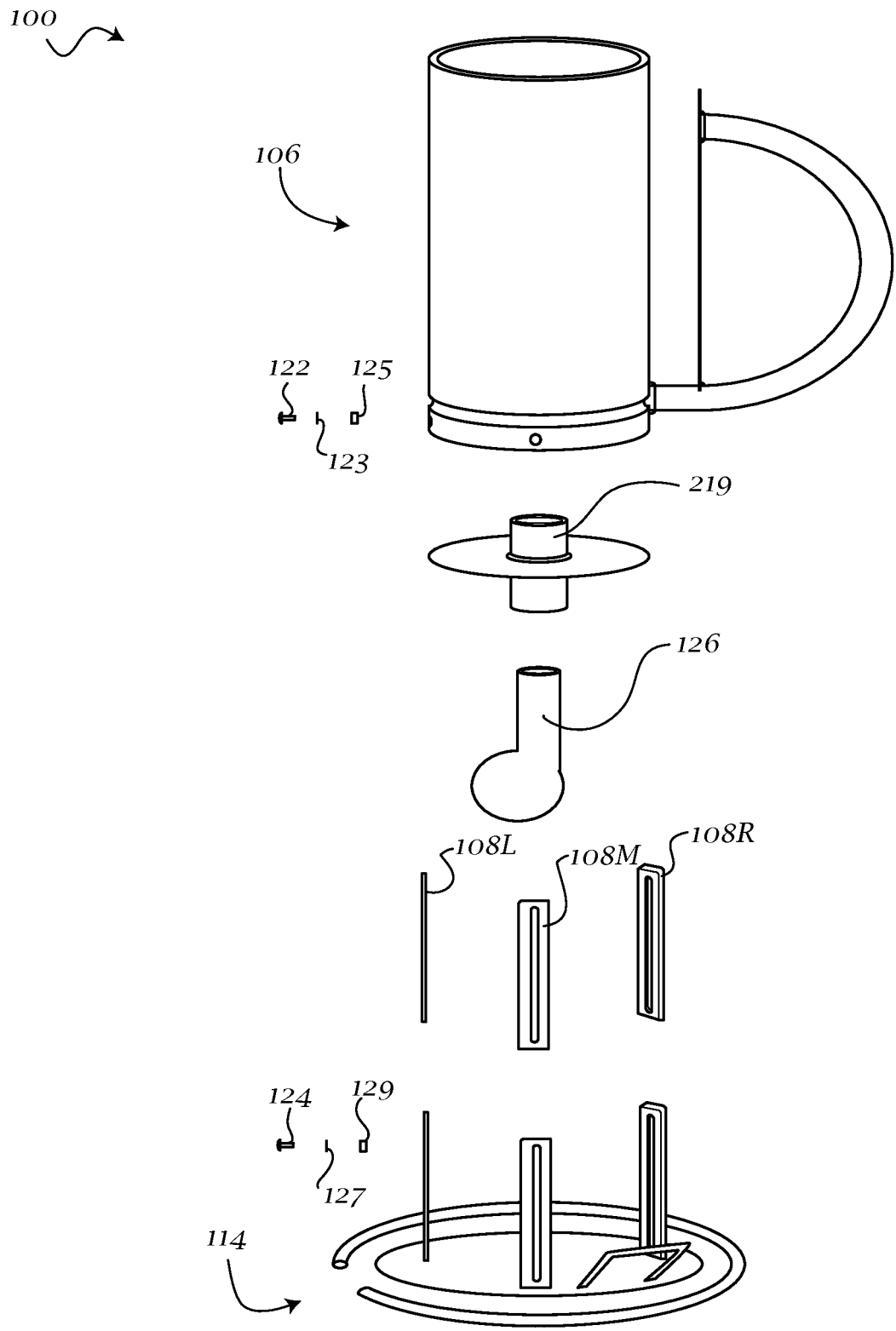
FIG. 2 is an exploded isometric view of an exemplary embodiment of an igniter apparatus.

Generally referring to FIGS. 1-2, an igniter assembly 100 may be shown. In one exemplary embodiment igniter assembly 100 may include an assembly of a heat chamber 106 and a heat gun 126 and means to insure that the heat gun 126 and the heat chamber 106 may remain together during use.

The heat chamber 106 may be made of mild steel or other metal capable of withstanding temperatures of, for example, 1500 degrees Fahrenheit. The heat chamber 106 may be coated with a heat resistant coating which may prevent corrosion and rusting if it is not made of corrosion resistant material, such as stainless steel.

An indentation may be formed in the heat chamber 106 near the base of the heat chamber 106. The indentation in the heat chamber 106 may allow a heat gun manifold 219 to be received within into the heat chamber 106 so that the heat gun manifold 219 may come to a stop at the bottom of the indentation, which may provide a close tolerance fit that may remain intact, for example, when the charcoal or burnable material 128 is ignited.

Three holes may be drilled into the heat chamber 106. The three holes may be equidistance apart below the indentation. The holes may be used to attach the upper legs 108 to the heat chamber 106 using, for example, an upper leg machine screw 122, lock washer 123 and nut 125. Upper legs 108 may also hold the heat gun manifold 219 in place against the indentation in the heat chamber 106.

A heat gun manifold flange 118 may be cut, for example, from mild sheet steel or other metal capable of withstanding temperatures of 1500 degrees Fahrenheit. At least one hole may be drilled in the center that is large enough to insert at least one heat gun manifold tube 120. In one exemplary embodiment, heat gun manifold tube 120 may be tack welded into place. The heat gun manifold tube 120 may also be made of mild steel or other metal capable of withstanding temperatures of 1500 degrees Fahrenheit. In an exemplary embodiment, the heat gun manifold tube 120 may be at least 0.12 inches thick and may have an inside diameter that matches the outside diameter of a nozzle of the heat gun 126. For example, most heat guns have an outside nozzle diameter of approximately 1.5 inches. In alternative embodiments, it is understood that any of heat gun manifold 219, heat gun manifold flange 119 and heat gun manifold tube 120 may be adaptable to heat guns of variable dimensions or to accommodate more than one heat gun simultaneously.

The upper legs 108 and lower legs 110 may be cut or punched from mild sheet steel or other metal with similar strength properties, with a slot traversing the middle of the each leg. The slot may be used to attach the upper leg 108 to the lower leg 110 using, for example, a machine screw 124, lock washer 127 and nut 129. The slot may allow for the attachment of the lower leg 108 to the upper leg 110 to be adjustable to suit a varying length of heat guns 126 that may exist. The upper leg 108 may be coated with a heat resistant coating to prevent corrosion and rusting if they are not made of corrosion resistant material such as stainless steel.

An upper handle 104 may provide a means for a user to hold the igniter assembly 100. Upper handle 104 may be a mild steel tube, or other metal with similar strength properties, approximately 1 inch in diameter, and may be bent into, for example, a semi-circular or J-shape form. Upper handle 104 may be welded or otherwise attached to the heat chamber 106, for example, near the bottom of the heat chamber 106 on the indentation equidistant from the upper leg holes. Since the heat chamber 106 may be hottest near the top and coolest near the bottom, a top portion of upper handle 104 may be independent from and unattached to the top of the heat chamber 106. A heat shield 102 may also be welded or otherwise attached to the top of upper handle 104, and at another point where the heat shield 102 may intersect the bottom of the upper handle 104. The upper handle 104 and heat shield 102 may also be coated with a heat resistant coating to prevent corrosion if they are not made of corrosion resistant material such as stainless steel.

To provide a means for a user to better control the igniter assembly 100, for example, during usage and carrying, a lower handle 112 may be constructed, for example, of approximately 0.25 inch diameter round rod mild steel or other material with similar strength properties. The lower handle 112 may bend into a shape that suits a user's hands.

A base 114 may be cut from sheet steel or other material with similar strength properties. In one exemplary embodiment, three lower legs 110 may be welded or otherwise attached to the base 114, for example, in a circular orientation equidistant apart and perpendicular to the base 114. The lower handle 112 may also be welded or otherwise attached to the base 114 equidistant between two lower legs 110 and angled approximately 30 degrees from the base 114 and may extend slightly beyond the edge 116 of the base 114.

Still referring generally to FIGS. 1-2, in an exemplary embodiment, the heat gun 126 may be received within the heat gun manifold 219. The heat gun manifold 219 with the heat gun 126 may then be received in the heat chamber 106, for example, until the heat gun manifold 219 touches the indentation in the heat chamber 106. The upper legs 108 may be attached to the heat chamber, for example, by using upper leg machine screw 122, upper leg lock washer 123 and upper leg nut 125. The top of the upper leg 108 may be pressed against the heat gun manifold 219.

The base 114 may be attached to the upper legs 108 by lower legs 110, for example, by aligning the lower handle 112 so that the lower handle 112 may be on the same side as the upper handle 104. The upper legs 108 may also be aligned to the lower legs 110 and may be attached using, for example, by the lower leg machine screw 124, lower leg lock washer 127 and lower leg nut 129 for each leg. The base 114 may be pushed toward the heat chamber 106 so that it may be flush against the base of the heat gun 126 and may secure the heat gun 126 into the heat gun manifold 219.

The igniter assembly 100 may light charcoal or other solid cooking fuels on fire cleanly so that it may be used to cook food. Igniter assembly may be used to dry out wet charcoal or other materials. In addition, igniter assembly may light wood on fire for use in a grill, smoker or for other food preparation purposes. Igniter assembly 100 may be used to char wood or heat non-burnable materials such as rocks or other materials that can fit inside the heat chamber 106.

The igniter assembly 100 may quickly and cleanly ignite charcoal or other solid fuels outside of a grill, smoker or other cooking device. The igniter assembly 100 may be portable and be used in a location remote from the cooking vessel or device. Ignited material may be transported inside igniter assembly 100 to the cooking device.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An igniter for solid cooking fuels, comprising:
   a heat chamber;
   a heat gun manifold, the heat gun manifold including:
      a manifold flange with a first hole, the manifold flange attached to a bottom of the heat chamber; and
      a manifold tube received within the first hole, a top of the manifold tube received at least partially within the heat chamber;
   a heat gun removably coupled to a bottom of the manifold tube, the heat gun in fluid communication with the heat chamber;
   an upper handle attached to an outer surface of the heat chamber; and
   a heat shield between the upper handle and the heat chamber.

2. The igniter of claim 1, further comprising:
   at least one upper leg with a first transverse slot, the at least one upper leg attached to the bottom of the heat chamber;
   at least one lower leg with a second transverse slot, wherein the at least one lower leg is coupled to the at least one upper leg by the first and second transverse slots.

3. The igniter of claim 2, wherein a height of the upper leg is adjustable relative to the lower leg along the first and second transverse slots.

4. The igniter of claim 2, further comprising:
   a base coupled to the at least one lower leg, wherein the base is pressed flush against a base of the heat gun to secure the heat gun to the heat gun manifold.

5. The igniter of claim 4, further comprising:
   a lower handle coupled to the base, the lower handle is angled at about 30 degrees to the base and extends beyond an edge of the base.

6. The igniter of claim 1, wherein the first heat gun may be removed and a second heat gun may be coupled to the bottom of the manifold tube.

7. The igniter of claim 1, wherein the heat chamber is a hollow cylindrical tube for receiving a solid cooking fuel.

8. The igniter of claim 1, wherein the upper handle is bent into a semi-circle with a first portion attached near the bottom of the heat chamber and a second portion independent from the heat chamber.

9. The igniter of claim 1, further comprising:
   an indentation in the heat chamber, wherein the heat gun manifold is received within the heat chamber so that the heat gun manifold may come to a stop at the bottom of the indentation.

10. The igniter of claim 1, further comprising:
    a plurality of legs, each leg with a first end attached to an outer diameter of the heat chamber, wherein the plurality of legs are equidistantly spaced about the outer diameter.

11. The igniter of claim 1, wherein the heat chamber, heat gun manifold, upper handle and heat shield are made of at least one of a substantially heat resistant material, aluminized steel or stainless steel.

12. The igniter of claim 1, wherein the heat chamber, heat gun manifold, upper handle and heat shield are coated with a heat resistant coating.

13. The igniter of claim 1, wherein the manifold flange is circular and has a diameter substantially equal to an inner diameter of the heat chamber.

14. A method for igniting a solid cooking fuel, comprising:
    placing solid cooking fuel into a heat chamber;
    attaching a heat gun manifold to the heat chamber such that a first end of a manifold tube is received at least partially within the heat chamber;
    attaching a heat gun to a second end of the manifold tube such that the heat gun is in fluid communication with the heat chamber;
    activating the heat gun;
    igniting the solid cooking fuel in the heat chamber by heat generated by the heat gun;
    deactivating the heat gun;
    transferring the solid cooking fuel from the heat chamber to a cooking vessel.

15. The method of claim 14, further comprising:
    attaching a plurality of adjustable legs to the heat chamber;
    attaching a base to the plurality of legs;
    adjusting a height of the legs such that the base is pressed flush against a base of the heat gun to secure the heat gun to the heat gun manifold.

16. The method of claim 15, further comprising:
    removing the heat gun from the manifold tube;
    attaching a second heat gun to the manifold tube;
    readjusting the height of the legs such that the base is pressed flush against the base of the second heat gun.

* * * * *